June 26, 1956

E. J. BOURGUIGNON 2,751,614

TOOL HOLDER PROVIDED WITH READILY
ADJUSTABLE ALIGNMENT MEANS

Filed Dec. 2, 1953

*INVENTOR.*
Emil Joseph Bourguignon
BY

ATTORNEYS

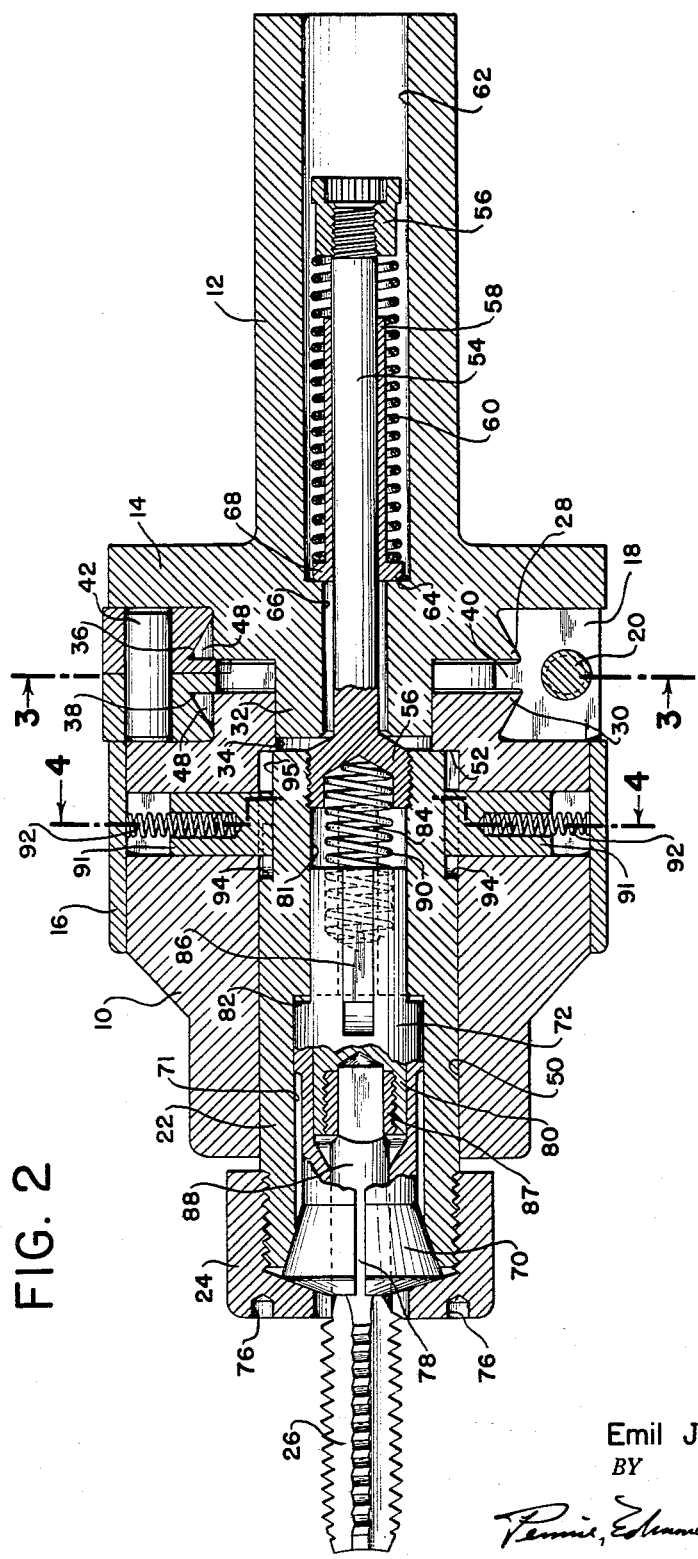

tates Patent Office 2,751,614
Patented June 26, 1956

2,751,614

TOOL HOLDER PROVIDED WITH READILY ADJUSTABLE ALIGNMENT MEANS

Emil Joseph Bourguignon, Farmingdale, N. Y.

Application December 2, 1953, Serial No. 395,656

9 Claims. (Cl. 10—129)

My invention relates to improvements in tool holders such as die heads, reamer holders, drill chucks, boring heads, tapping heads and other types of tool adapters.

More particularly my invention relates to a tool adapter or head which is adjustable for alignment with the work. For example, when my improved tool holder is used as a tapping head, it may be adjusted so that the tap is aligned with respect to the work and goes in straight.

One of the difficulties in effecting various tooling operations, such as tapping is that the tap may be held out of alignment with respect to the work because the lathe is out of alignment.

The primary object, therefore, of my invention is to provide an improved tool adapter or tool head which is readily aligned with respect to the work.

A further object of my invention is to provide an adjustable tool holder which includes a releasing mechanism, whereby a tap, for example, is readily released for rotation with the work and ready for disengagement from the work when the latter is rotated in the reverse direction.

Various attempts have been made to provide floating tool holders adapted to compensate for angular misalignment of the tool with respect to the work, but for the most part, such tool holders are extremely complicated and difficult to adjust and do not compensate for an offset misalignment.

In accordance with my invention, I have discovered that a tool holder may be provided with a relatively simple mechanism for compensating for parallel or off-set misalignment of the tool with respect to the work or with respect to a misaligned turret lathe or with a tail stock of the lathe which is out of alignment. In a preferred construction I provide a readily adjustable eccentric locking means between the body of the tool holder and the shank, this locking means being in the form of a joint structure including a locking or clamping means for securing the body of the tool holder in any predetermined off-set setting with respect to the shank of the tool holder.

A circular dove tail locking joint structure is advantageously arranged eccentrically with respect to either the tool holder body or the shank and concentric with respect to the other, or is arranged eccentrically with respect to both, the joint including a clamping ring serving to hold the tool holder body in a fixed position with respect to the shank or spindle, with their axes in alignment or with their axes angularly offset and parallel with respect to each other to a predetermined extent.

In a preferred construction the tool holder includes a relatively simple releasing mechanism, useful, for example, in case of tapping so that the work may be readily removed from the tap, this mechanism including a cylinder or sleeve axially movable in the body of the tool holder and cooperating plungers or dogs. In one position, as during a tapping operation, the cylinder is held against rotation by the plungers, but when the cylinder is pulled out at the end of the tapping operation the cylinder is released for rotation, at which time the plungers ride on cams. When the cylinder is rotated in the reverse direction, for disengaging the tap, the plungers stop the reverse rotation of the cylinder, even though it is in its pulled-out position in the tapping head.

The improved tool holder of the present invention includes other features and advantages described more in detail hereinafter in connection with a single embodiment of the invention illustrated as a tapping head.

In the drawings:

Fig. 2 is a longitudinal sectional view of the tapping head shown in Fig. 1, on an enlarged scale;

Figure 1:
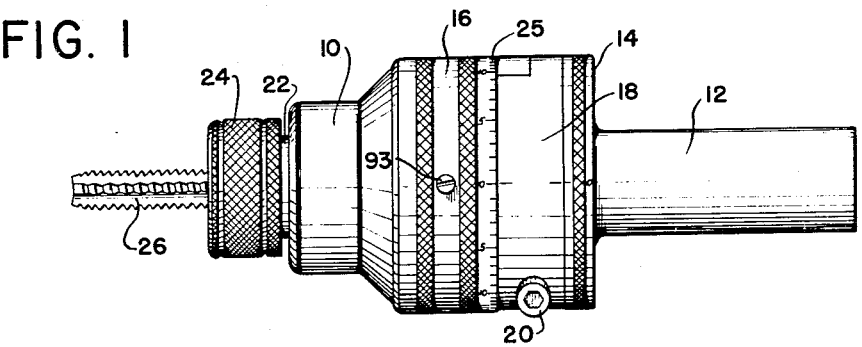
Fig. 1 is a side elevational view of a tapping head tool holder constructed in accordance with the invention.

Referring to Fig. 1 of the drawings, the tool holder illustrated therein as a tapping head comprises a tool holder body 10 carried on a shank 12 by which the tool holder is secured in a turret lathe or other machine. The shank 12 includes an integral flange 14 having the same external diameter as a sleeve 16 surrounding a portion of the body of the tool holder. The shank or rear portion of the tool holder is secured to the body of the tool holder by means of a locking or clamping joint including a split hinged locking ring 18, the free ends of which are drawn together by means of a locking bolt or stud 20. At the front end of the tool holder, a releasing cylinder 22 projects from the body 10 and is surrounded at the end by a collet locking nut 24, which locks a tap 26 in place in the cylinder 22 of the tapping head.

The finished tapping head, as shown in Fig. 1, includes a scale 25 in thousands of an inch carried on the edge of the sleeve 16 adjacent the locking ring 18, while the flange 14 carried a zero index as shown opposite the zero index of the scale 25. The ring 18 may have index marks as shown opposite the zero indexes to facilitate accurate setting of the body 10 with respect to the shank 12. The flange 14, the sleeve 16 and the locking nut 24 are provided with medium knurling to facilitate handling and relative rotation of the parts.

Figure 3:
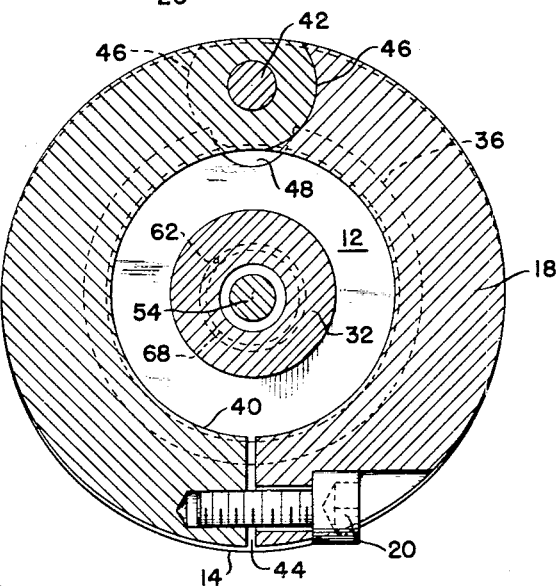
Fig. 3 is a cross-sectional view taken on the line 3—3 of Fig. 2.

The means by which the body 10 of the tool holder is clamped to the shank 12 is shown in Figs. 2 and 3, and preferably comprises a clamping structure including similar annular facing elements having a common axis respectively carried by the body 10 and the shank 12 which are located eccentrically with respect to the axes of the body 10 and the shank 12 and which cooperate with the locking clamp 18. The arrangement of the clamping elements with their common axis parallel to and eccentrically located with respect to the axes of the body 10 and shank 12 provides a construction by which the body 10 and the shank 12 may be rotated or offset relative to each other on the eccentric axis and thereby compensate for misalignment between the tool and the work. For example, if it is determined that the tail stock of a lathe is offset or out of alignment with respect to the spindle, a certain number of thousandths of an inch, the body 10 may be rotated to that extent with respect to the shank 12, clamped in the rotated position by means of the locking ring 18 or another form of clamping member, thereby correcting for the misalignment of the lathe.

In the illustrative example shown in the drawings, particularly Figs. 2 and 3, the clamping elements cooperating with the locking ring 18 comprise similar facing circular dove-tail-like flanges 28 and 30, facing each other and respectively integral with the shank 12 and the body 10. These dove tail flanges are at right angles to the axes of the body and shank and have a common axis offset with respect to the axes of the shank 12 and the body 10, for example, the common axis may be offset to the extent of 1/32 of an inch, or other desired distance. Fig. 2 shows the offset as being directly above the axes of the body 10 and shank 12, with these axes in alignment or coincident.

The forward end of the shank 12 advantageously includes a forwardly projecting cylindrical crank pin or guiding member 32, the external surface of which is concentric with the periphery of the dove tail flange 28, and the body 10 includes a cylindrical bore 34 in which the cylindrical guiding member 32 fits, the bore 34 being concentric with the periphery of the dove tail flange 30. The cylindrical crank pin 32 and its cooperating bore 34 have axes common with the flanges 28 and 30 and are therefore eccentrically arranged with respect to the shank 12 and body 10, respectively, so that the cylindrical member 32 is in effect a crank pin or shaft for the tool holder on the axis of which the body 10 and shank 12 may be bodily displaced or offset with respect to each other so that their axes, while still parallel, are out of alignment with respect to each other. The arrangement is such, as shown in Fig. 2, that the axes of the body 10 and shank 12 may be aligned or moved out of alignment with respect to each other to the desired extent by relative rotation about the common axis of the flanges 28 and 30 and the cylindrical guiding member 32 and its cooperating bore 34. The same result will be achieved if the member 32 projects from the body 10 and the bore 34 is located in the shank 12.

The annular dove tail flanges 28 and 30 have a common axis and cooperate with the particular structure of the annular locking ring 18, which includes annular dove-tail-shaped grooves 36 and 38, as shown in Fig. 2 having sloping surfaces which fit the dove tail surfaces of the flanges 28 and 30. The locking ring also includes a central inwardly projecting guiding and reinforcing rib 40 which extends into the space between the dove tail flanges 28 and 30. The locking ring 18, as shown in section in Fig. 3, is made in two equal semi-circular parts which are hinged together by means of a hinge pin 42, the opposite ends of the parts being slightly separated at 44 (Fig. 3) and held together by the locking bolt 20. The rib 40 is narrower than the normal space between the dove tail flanges 28 and 30 so that when the bolt 20 is drawn up tightly, the bevel surfaces of the grooves 36 and 38 act respectively on the bevel dove tail surfaces of the flanges 28 and 30, respectively, to draw the body 10 and shank 12 together until their sides adjacent the sides of the locking ring 18 are firmly drawn and clamped against the locking ring so that the body 10 is rigidly clamped to the shank 12.

When it is desired to rotate the body 10 on the crank pin 32, the bolt 20 is unscrewed until the clamp 18 is loosened, whereupon the body 10 is readily rotated on the cylindrical guiding member 32 the desired number of graduations, clockwise or counterclockwise with respect to the zero index on the flange 14 of the shank 12. After this rotation has been effected, the clamping ring 18 is tightened by drawing up on the bolt 20. Even when the clamping ring is tight there is always a small space 44 between the ends of the clamping ring opposite the hinge.

The form of hinge shown for the clamping ring 18 may be different from that shown in which each section of the ring at the hinge is split centrally to provide similar single leaves having rounded ends 46 concentric with the axis of the pin 42, as shown in Fig. 3. In order to mount the ring 18 on or in the tool holder, or to remove the ring in disassembling the tool holder, the bolt 20 is completely removed and the two parts of the ring spread apart by swinging them on the hinge pin 42. However, the hinge pin 42 must be directly over concave grooves 48 in the dove tail flanges 28 and 30 so that the rounded portions 46 will have room for rotation inwardly about the axis of the pin 42. It is also necessary that the concave grooves 48 in the dove tail flanges 28 and 30 be directly opposite each other when the clamping ring 18 is applied or removed from the tool holder proper. The centers of the grooves 48 may be indexed on the flange 14 and sleeve 16 to facilitate removal of the clamping ring 18. Such indices may coincide with the zero indices shown in Fig. 1.

The releasing cylinder 22 is slidably and rotatably mounted in an axial bore 50 in the body 10 with its inner end engaging an annular shoulder 52 at the forward end of the bore 34 when the releasing cylinder is in its driving position, as shown in Fig. 2. The improved tool holder includes means for simultaneously urging the body section 10 toward the shank section 12 and for biasing the releasing cylinder 22 toward its driving position in the tool holder body, such means including a shank stud 54 having an enlarged forward end 56 threaded in the inner end of the cylinder 22 and having a threaded opposite end receiving a countersunk nut 56, a travel stop sleeve 58 and a compression spring 60. The stud 54 and the elements 56, 58 and 60 are arranged in an axial bore 62 in the shank 12 which terminates in a shoulder 64 at the back end of a smaller axial bore 66 extending through the eccentrically arranged cylinder 32. The stud 54 extends through the bore 34 in the body 10 and the bore 66 into the bore 62, the bore 66 being sufficiently larger than the stud 54 to accommodate the stud at maximum offset of elements 10 and 12. The sleeve 58 is provided with a shouldered head 68 which engages the shoulder 64 and serves as a seat for one end of the spring 60, the sleeve 58 having a length such that it is engaged by and serves as a stop for the nut 56 and the releasing cylinder 22, so that the latter is allowed to slide in the head 10 only to its releasing position. The spring 60 and its associated elements also serve to bias the body section 10 and shank section 12 toward each other so that they stay together and do not fall apart when the locking ring 18 is loosened for adjusting the alignment of the tool holder.

The releasing cylinder 22 carries mechanism for mounting and retaining a tool, such as the tap 26, this mechanism including a collet 70 slidably arranged in a forward bore 71 of the cylinder 22, the collet including a cylindrical shank portion 72 fitting the bore 71, a conical surface fitting a similar forward end surface in the cylinder 22 and a forward steep conical surface engaged by and fitting a similar surface in the collet locking nut 24 threaded to the exterior forward end of the cylinder 22. The locking nut 24 includes end holes 76 engageable by a spanner wrench for locking the die or other tool in the collet, the forward end of which has three radial splits, one of which, 78, is shown in Fig. 2 for permitting expansion and contraction of the head of the collet in accordance with the usual practice.

Means located in the releasing cylinder 22 is provided for holding and driving the shank of the tool, such as the tap 26, this means including a tap drive 80 having a cylindrical exterior surface fitting and slidable in the rearwardly extending cylindrical bore of the collet 70. The tap drive 80 is also slidably mounted in the inner portion of the cylinder 22, which has a bore 81 smaller than the bore 71 occupied by the shank 72 of the collet and which terminates in a shoulder 82 from which the inner end of the collet is normally spaced. The cylinder 22 is provided with a pair of diametrically arranged keyways 84 extending the depth of bore 71 and the full length of the bore 81, these keyways being occupied by keys 86 set in the outer rear portion of the tap drive 80, one key being seen in Fig. 2 and the ends of both being shown in Fig. 3. The forward end of the tap drive 80 is provided with a threaded tap drive insert 87, which is threaded into the end of the drive 80 and provided with a square hole for receiving the square end portion of the shank 88 of the tap 26. The tap drive insert 87 is interchangeable and is selected according to the dimensions of the square portion of the shank of the tool.

It will be noted that the inner end of the tap drive 80 is spaced a considerable distance from the forward enlarged end 56 of the stud 54 threaded into the inner end of the cylinder 22. Furthermore, the enlarged end 56 and the inner end of the tap drive 80 are recessed axially and accommodate the respective ends of a compression spring 90 which biases the tap drive 80 toward the forward end of the cylinder 22. This arrangement is provided to accommodate tools having shanks of varying lengths, since when the tool is inserted in the collet 70 and the squared portion is inserted in the tap drive insert 87, the tool and the tap drive 80 may be pressed against the bias of the spring 90, so that the tool is properly set with respect to the collet and collet lock nut 24. In Fig. 2 the tap 26 is shown as having a relatively short shank. In any case, the spring 90 maintains the tap drive 80 in engagement with the squared end of the tap or other tool. The tap drive 80 provides a positive drive and cooperates with the collet 70 to keep the tool in perfect alignment.

Figure 4:
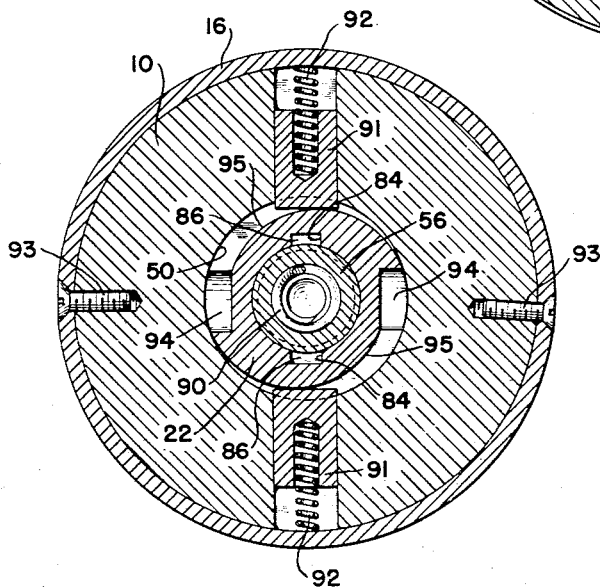
Fig. 4 is a cross-sectional view taken on the line 4—4 of Fig. 2, with the releasing cylinder pulled out to its releasing position and rotated through an angle of 90°.

The releasing cylinder 22 is driven, or held against rotation by a pair of diametrically opposed square plungers or dogs 91 mounted in the body 10 of the tool holder adjacent the inner end portion of the releasing cylinder 22, as shown in Figs. 2 and 4, these plungers being biased toward the releasing cylinder by means of springs 92 engaging the inner surface of the sleeve 16. The sleeve 16 is held in place by means of oppositely arranged screws 93, which are not in alignment, or are not on the same diameter so that the sleeve 16 will always be correctly replaced when removed, the sleeve being removable for the purpose of inserting the blocks 91 and springs 92. When the releasing cylinder 22 is in its driving position bearing against the shoulder 52 as in Fig. 2, the plungers 91 are respectively engaged in longitudinal peripheral slots 94 cut in the peripheral surface of the cylinder 22 at 90° with respect to the keyways 84, Fig. 4, the slots 94 extending from the inner end of the cylinder a distance of approximately twice the width of the square plungers 91. The plungers 91 normally engage in the forward portions of the slots 94 during a tapping operation, as shown in Fig. 2, in which position the opposite sides of the slots extend along the respective sides of the plungers and prevent relative rotation in either direction.

The inner end of the releasing cylinder 22 is cut away to provide similar cam surfaces 95, at the inner end of the cylinder, extending from and opening respectively into one side of the slots 94. These cam surfaces extend along the cylinder a distance at least as great as or somewhat greater than the width of the plungers 91, and each cam surface extends from the bottom of one slot 94 in an arc to the periphery of the cylinder 22 adjacent to the other slot 94. At the completion of a tapping operation when the stop has been reached, the releasing cylinder is pulled forward until the square plungers 91 are no longer engaged in the slots 94 in front of the cams but ride on the cams, permitting the tap and the cylinder to be rotated relative to the body of the tool holder. On reversing the direction of rotation, the square plungers 91 ride downwardly along the cam surfaces and re-engage the sides of the slots 94 opposite the cam surfaces, within a half turn, and hold the releasing cylinder against rotation in the opposite direction until the tap is disengaged from the work. At this point the plungers 91 are in position to enter the slots 94, and the releasing cylinder 22 is retracted against the shoulder 52 by the spring 60. This spring holds the releasing cylinder back in driving engagement with the square plungers 91 during a tapping operation.

From the foregoing description, it is to be understood that, while the tool holder has been described and illustrated in connection with its use as a tapping head, it may be used in general as a tool adapter, including its mechanism for adjusting the alignment in the machine in which it is used. The tool holder may, for example, be used as a die head, a reamer holder, a drill chuck holder, a tool head for turret lathes and for other purposes. Various types of tool holders may be made with the alignment locking mechanism incorporated therein without greatly increasing their cost, since the shank portion of any tool holder may be made with the elements of the clamping mechanism included therein at the rear portion of the body of the holder. The shank section may even include a flange corresponding to the flange 14 which will have a diameter approximating that of the body of the tool holder, and both provided with the eccentrically arranged annular locking elements, the effective surfaces of which are perpendicular to the axes of the shank and body sections, which are engageable by a locking ring or other locking member. A die head, for example, may be constructed to include these features, and die heads or other tool holders may be made with the elements of the eccentric locking mechanism entirely on the periphery of the tool holder. The greater the relative diameter of the locking surfaces of the locking mechanism, the more rigid the two sections of the tool holder are held together. While the locking mechanism advantageously includes a guiding crank pin or shaft arrangement, such as the cylindrical member 32 and bore 34, the parts of the tool holder can be effectively guided with respect to each other during adjustment by the loosened clamping ring.

It is furthermore to be understood that instead of using the particular type of collet shown in the drawings, the forward end of the releasing cylinder or body may be provided with a tapped hole for a set screw for use in securing other tools.

The tool holder of the present invention is of relatively simple construction and is readily adjustable for correcting any offset error or out of alignment which may be present in any machine, it being understood that many machines after considerable use get out of alignment. All that is required is to determine the amount of offset in thousandths of inches, release the locking stud 20, separate the body 10 slightly from the shank 12 against the action of the spring 60, rotate the body 10 and shank 12 relative to each other the predetermined number of thousandths of an inch for the offset, tighten up the locking stud 20 and then loosen the shank in the machine and rotate the head to the alignment position of the spindle of the lathe. After this is accomplished, the shank is again locked in the turret or machine and the tool will go straight into the work.

While the dove tail locking and clamping arrangement is preferred and particularly desirable and effective, it is to be understood that the eccentrically arranged locking structure may have other forms, as for example, somewhat different elements may be used in place of the annular dove-tail shaped flanges 28 and 30, provided the locking ring includes complementary cooperating surfaces for locking the shank and body together. For example, instead of the dove-tailed flanges 28 and 30, these flanges may be rounded or grooved or otherwise arranged in cooperation with a suitably corresponding ring for locking the respective parts together. The ring may be threaded to either the body 10 or the shank 12 and suitably locked to the other member either by a threading arrangement, a set screw arrangement or other suitable locking means. However, the preferred construction includes elements of the general type of elements 28 and 30 of relatively large diameter cooperating with an outer clamping ring so as to insure a perfect locking engagement which will not be disturbed during the operation of the tool holder. The locking mechanism, as shown and described, makes a very solid rigid head of the two sections 10 and 12.

In constructing a tool holder according to the invention, which includes the elements for adjusting for parallel or offset misalignment, these elements may, if desired, be arranged on the main axis of the tool holder, while the shank and collet or other means for fastening a tool in the holder, are arranged on eccentric axes which are offset an equal amount and parallel to the main axis of the tool holder. In other words the shank and the bore for the releasing cylinder or other elements for receiving the tool are offset from the main axis an equal amount.

A tool holder may be made according to the invention to provide a rigid structure which would take care of angular misalignment in machines, although such misalignment is now sometimes taken care of by providing floating tool holders or tool holders with a certain amount of play between the collet and the body of the tool holder. Where a rigid structure is desired, angular misalignment may be taken care of by constructing the tool holder so that the parallel locking flanges are respectively arranged with their planes inclined at an angle of a few degrees with respect to the axis of the locking mechanism and the axes of the shank and body. In this construction when one flange is rotated with respect to the other, the tool holder will compensate for angular misalignment or for both offset and angular misalignments, if required, and at the same time provide a rigid construction.

What I claim is:

1. A tool holder adjustable to compensate for the misalignment of a machine, comprising a body section including means for securing a tool in its forward end, a shank section including a shank for mounting the tool holder on a machine, a pair of spaced similar annular locking flanges located between said sections and respectively carried thereby, said flanges facing each other and having a common axis eccentrically arranged with respect to the axes of the tool securing means and the shank of the tool holder, each flange having an annular beveled surface sloping inwardly away from the other flange, and a split hinged ring for clamping said flanges together for locking the body section to the shank section of the tool holder, said clamping ring being provided with spaced inwardly projecting annular sections respectively fitting the beveled surfaces of said flanges and having parallel flat sides, said body section and said shank section having parallel flat sides respectively facing and engaging the parallel flat sides of the clamping ring when said sections are drawn toward each other by the clamping ring and said sections being rotatable with respect to each other about the common axis of said flanges when the clamping ring is loosened, for adjusting the tool holder to compensate for misalignment of the machine.

2. A tool holder as claimed in claim 1, including a crank shaft connecting the body and shank sections concentric with the common axis of the locking flanges, and spring means for biasing said sections toward each other.

3. A tool holder adjustable to compensate for the misalignment of a machine, comprising a body section including means for securing a tool in its forward end on a tool axis, a shank section including a shank having an axis for mounting the tool holder on a machine, a pair of similar spaced adjacent annular locking elements respectively integral with the body section and shank section, said elements facing each other and having a common axis parallel to and eccentrically arranged with respect to the tool and shank axes, said axes being equidistant from said common axis, a split hinged clamping ring engaging said elements for locking the body section to the shank section of the tool holder, and a cylindrical guiding means concentric with said elements carried by one of said sections and extending slidably into the other, said other section being provided with a cylindrical bore receiving and fitting said guiding means, said locking elements being in spaced relation with respect to each other when the clamping ring is in locking engagement therewith, said body section and said shank section being rotatable with respect to each other about the common axis of said elements and guiding means, when the ring is loosened, whereby the tool and shank axes may be offset with respect to each other for adjusting the tool holder to compensate for misalignment of the machine.

4. A tool holder as claimed in claim 3, including a releasing cylinder located in the body section of the tool holder, said cylinder being rotatable and slidable in the body section, means located in the body section and the shank section for biasing said sections toward each other, said biasing means including a rod attached to said releasing cylinder and extending into the shank section, a spring in the shank section surrounding said rod, and stop means in the body section of the tool holder engaged by the releasing cylinder.

5. A tool holder as claimed in claim 4, in which the releasing cylinder includes at least one longitudinal peripheral slot and the body section includes at least one inwardly biased dog engaging in said slot to prevent rotation of said releasing cylinder when said cylinder is against said stop, and a cam surface on the periphery of said releasing cylinder opening into the rearward portion of one side of said slot whereby said cylinder is released for rotation relative to said body section when pulled forward so that the cam surface is in line with said dog.

6. A tool holder as claimed in claim 5, in which the means for securing a tool in the forward end of the body section is located in and carried by the releasing cylinder and includes a collet at the forward end of the releasing cylinder and driving means keyed to and slidable in the releasing cylinder, the forward end of the driving means being provided with a receptacle for receiving the end of the tool shank and holding it against rotation, and means in the releasing cylinder for biasing the driving means forwardly to ensure its engagement with the shank of the tool.

7. A tool holder as claimed in claim 3, in which said ring comprises a pair of semi-cylindrical sections one of each of which is pivoted to one end of the other, and means for drawing the free ends of the ring toward each other.

8. A tool holder as claimed in claim 5, in which the locking elements and the ring together comprise an annular dove tail joint structure.

9. A tool holder as claimed in claim 3, in which the clamping ring is provided with parallel flat sides respectively facing toward the body and shank sections, and said body and shank sections being respectively provided with parallel flat sides facing and engaging respectively the parallel flat sides of the clamping ring when the body and shank sections are held in fixed position with respect to each other.

References Cited in the file of this patent

UNITED STATES PATENTS

| 37,767 | Perley | Feb. 24, 1863 |
| 322,636 | Pement | July 21, 1885 |
| 956,298 | Cudahy | Apr. 26, 1910 |
| 963,559 | Hines | July 5, 1910 |
| 1,051,531 | Whipple | Jan. 28, 1913 |
| 1,126,919 | Tyson | Feb. 2, 1915 |
| 1,174,309 | Clermont et al. | Mar. 7, 1916 |
| 1,514,580 | Floeter | Nov. 4, 1924 |
| 2,564,666 | Beacom | Aug. 21, 1951 |
| 2,643,556 | Briney | June 30, 1953 |